United States Patent
Nellenbach et al.

(10) Patent No.: US 6,356,548 B1
(45) Date of Patent: Mar. 12, 2002

(54) POOLED RECEIVE AND TRANSMIT QUEUES TO ACCESS A SHARED BUS IN A MULTI-PORT SWITCH ASIC

(75) Inventors: Scott Nellenbach, Apex; Kenneth Michael Key, Raleigh; Edward D. Paradise, Chapel Hill; Kenneth H. Potter, Jr., Raleigh, all of NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/106,245

(22) Filed: Jun. 29, 1998

(51) Int. Cl.[7] .................. H04L 12/40; H04L 12/66; H04J 3/02

(52) U.S. Cl. .................. 370/362; 370/462; 370/401

(58) Field of Search .................. 370/413, 389, 370/400, 401, 402, 403, 351, 412–411, 395.1, 395.4, 395.41, 395.42, 395.7, 395.71, 395.72, 438, 445, 428–429, 422–423, 489

(56) References Cited

U.S. PATENT DOCUMENTS

| | | | |
|---|---|---|---|
| 4,598,400 A | 7/1986 | Hillis | 370/60 |
| 4,709,327 A | 11/1987 | Hillis et al. | 364/200 |
| 4,756,606 A | 7/1988 | Rickard | |
| 4,773,038 A | 9/1988 | Hillis et al. | 364/900 |
| 4,791,641 A | 12/1988 | Hillis | 371/38 |
| 4,805,091 A | 2/1989 | Thiel et al. | 364/200 |
| 4,809,202 A | 2/1989 | Wolfram | 364/578 |
| 4,864,559 A | 9/1989 | Perlman | 370/60 |

(List continued on next page.)

FOREIGN PATENT DOCUMENTS

| | | |
|---|---|---|
| JP | 4-319564 | 11/1992 |
| JP | 8-87802 | 4/1996 |

OTHER PUBLICATIONS

Japanese Office Action, dated May 11, 1999, with English Language translation of Japanese Examiner's comments.
Cisco Catalyst Workgroup Switch Version 3.0, web, http://www.cisco.com/warp/public/558/16.html, pp. 1–5.
Cisco VLAN Roadmap, web, http://www.cisco.com/warp/public/538/7.html, pp. 1–9.
IAC (SM) Newsletter Database (TM) Communications Industry Researchers, Broadband Networks and Applications, copyright 1995 Information Access Company, a Thomson Corporation Company, Section No. 16, vol. E; ISSN: 1059–0544, Headline, Cisco Announces New Fast Ethernet Interface, pp. 2–3.
IAC (SM) Newsletter Database (TM) Communications Industry Researchers, Broadband Networks and Applications, copyright 1995 Information Access Company, a Thomson Corporation Company, Section No. 16, vol. 3; ISSN: 1059–0544, Headline, Cisco Announces Token–Ring Switching Products, pp. 4–5.
Cisco 7000 Series Gains Fast Ethernet Interface, Becomes Only Router Family to Support Three High–Speed Network Types, web, http://www.cisco.com/warp/public/146/199.html pp. 1–2.

(List continued on next page.)

*Primary Examiner*—Chau Nguyen
*Assistant Examiner*—Ron Abelson
(74) *Attorney, Agent, or Firm*—Cesari and McKenna, LLP

(57) ABSTRACT

A multi-port switching device architecture decouples decode logic circuitry of each port of a network switch from its respective state machine logic circuitry and organizes the state machine logic as pools of transmit/receive engine resources that are shared by each of the decode logic circuits. Intermediate priority logic of the switching device cooperates with the decode logic and pooled resources to allocate frames among available resources in accordance with predetermined ordering and fairness policies. These policies prevent misordering of frames from a single source while ensuring that all ports in the device are serviced fairly.

20 Claims, 5 Drawing Sheets

U.S. PATENT DOCUMENTS

| | | | |
|---|---|---|---|
| 4,870,568 A | 9/1989 | Kahle et al. | 364/200 |
| 4,993,028 A | 2/1991 | Hillis | 371/39.1 |
| 5,014,265 A | 5/1991 | Hahne et al. | |
| 5,018,137 A | 5/1991 | Backes et al. | 370/85.13 |
| 5,027,350 A | 6/1991 | Marshall | 370/85.13 |
| 5,070,446 A | 12/1991 | Salem | 395/500 |
| 5,088,032 A | 2/1992 | Bosack | 395/200 |
| 5,111,198 A | 5/1992 | Kuszmaul | 340/825.52 |
| 5,113,510 A | 5/1992 | Hillis | 395/425 |
| 5,117,420 A | 5/1992 | Hillis et al. | 370/60 |
| 5,124,981 A | 6/1992 | Golding | |
| 5,129,077 A | 7/1992 | Hillis | 395/500 |
| 5,148,547 A | 9/1992 | Kahle et al. | 395/800 |
| 5,151,996 A | 9/1992 | Hillis | 395/800 |
| 5,175,865 A | 12/1992 | Hillis | 395/800 |
| 5,212,773 A | 5/1993 | Hillis | 395/200 |
| 5,222,216 A | 6/1993 | Parish et al. | 395/275 |
| 5,222,237 A | 6/1993 | Hillis | 395/650 |
| 5,224,099 A | 6/1993 | Corbalis et al. | |
| 5,247,613 A | 9/1993 | Bromley | 395/200 |
| 5,247,694 A | 9/1993 | Dahl | 395/800 |
| 5,261,105 A | 11/1993 | Potter et al. | 395/725 |
| 5,265,207 A | 11/1993 | Zak et al. | 395/200 |
| 5,274,631 A | 12/1993 | Bhardwaj | |
| 5,280,470 A | 1/1994 | Buhrke et al. | |
| 5,289,156 A | 2/1994 | Ganmukhi | 340/146.2 |
| 5,301,310 A | 4/1994 | Isman et al. | 395/575 |
| 5,331,637 A | 7/1994 | Francis et al. | 370/54 |
| 5,353,283 A | 10/1994 | Tsuchiya | 370/60 |
| 5,355,492 A | 10/1994 | Frankel et al. | 395/700 |
| 5,359,592 A | 10/1994 | Corbalis et al. | |
| 5,361,256 A | 11/1994 | Doeringer et al. | 370/60 |
| 5,361,363 A | 11/1994 | Wells et al. | 395/800 |
| 5,367,692 A | 11/1994 | Edelman | 395/800 |
| 5,388,214 A | 2/1995 | Leiserson et al. | 395/200 |
| 5,388,262 A | 2/1995 | Hillis | 395/650 |
| 5,390,298 A | 2/1995 | Kuszmaul et al. | 395/200 |
| 5,394,402 A | 2/1995 | Ross | 370/94.1 |
| 5,404,296 A | 4/1995 | Moorhead | 364/421 |
| 5,404,538 A | 4/1995 | Krappweis | |
| 5,404,562 A | 4/1995 | Heller et al. | 395/800 |
| 5,414,704 A | 5/1995 | Spinney | 370/60 |
| 5,442,633 A | 8/1995 | Perkins et al. | 370/94.1 |
| 5,485,627 A | 1/1996 | Hillis | 395/800 |
| 5,500,860 A | 3/1996 | Perlman et al. | 370/85.13 |
| 5,511,168 A | 4/1996 | Perlman et al. | 395/200.15 |
| 5,530,809 A | 6/1996 | Doulas et al. | 395/200.2 |
| 5,535,408 A | 7/1996 | Hillis | 395/800 |
| 5,555,543 A | 9/1996 | Grohoski et al. | |
| 5,561,669 A | 10/1996 | Lenney et al. | |
| 5,583,996 A | 12/1996 | Tsuchiya | 395/200.15 |
| 5,600,644 A | 2/1997 | Chang et al. | 370/404 |
| 5,612,959 A | 3/1997 | Takase et al. | 370/390 |
| 5,617,421 A | 4/1997 | Chin et al. | 370/402 |
| 5,617,538 A | 4/1997 | Heller | 395/200.02 |
| 5,633,858 A | 5/1997 | Chang et al. | 370/255 |
| 5,633,866 A | 5/1997 | Callon | 370/397 |
| 5,673,423 A | 9/1997 | Hillis | 395/553 |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,764,636 A | 6/1998 | Edsall | 370/401 |
| 5,796,732 A | 8/1998 | Mazzola et al. | |
| 5,796,740 A | 8/1998 | Perlman et al. | 370/401 |
| 5,818,842 A | 10/1998 | Burwell et al. | 370/397 |
| 5,828,844 A | 10/1998 | Civanlar et al. | 395/200.58 |
| 5,898,686 A | 4/1999 | Virgile | 370/381 |
| 5,909,441 A | 6/1999 | Alexander, Jr. et al. | 370/395 |
| 5,909,550 A | 6/1999 | Shankar et al. | 395/200.57 |

OTHER PUBLICATIONS

ISL Functional Specification, web, http://www.cisco.com/warp/public/741/4.htm, pp. 1–4.

Cisco–Catalyst 5000 Software Release 2.1 Feature Set, web, http://www.cisco.com/warp/public/729/c5000/426_pp.htm, pp. 1–9.

*IEEE Standard Project P802.1Q,Draft Standard for Virtual Bridged Local Area Networks*, Copyright by the Institute of Electrical and Electronics Engineers, Inc., Feb. 28, 1997, pp. 1–88.

Draft Standard P. 802.1Q/D10, *IEEE Standards for Local and Metropolitan Area Networks*: Virtual Bridged Local Area Networks, Copyright by the Institute of Electrical and Electronics Engineers, Inc., Mar. 22, 1997, pp. 1–212.

ISL Configurations for Cisco IOS and the Catalyst 5000, web, http://www.cisco.com/warp/public/741/8.html, pp. 1–8.

Dynamic Inter–Switch Link Protocol, 2.2 Configuration Note, pp. 2–6.

Virtual LANs, Catalyst 2820 Series and Catalyst 1900 Series Enterprise Edition Software Configuration Guide, Chapter 2, pp. 2–1–2.49.

Configuring VTP and Virtual LANs, Catalyst 5000 Series Software Configuration Guide, Chapter 13, pp. 13–1–13.24.

POOLED RECEIVE AND TRANSMIT QUEUES TO ACCESS A SHARED BUS IN A MULTI-PORT SWITCH ASIC

FIELD OF THE INVENTION

The present invention relates to computer network switches and, in particular, to a multi-port switching device architecture of a network switch.

BACKGROUND OF THE INVENTION

A network switch of a data communications network provides a switching function for transferring information, such as data frames, among entities of the network. Typically, the switch is a computer comprising a collection of components (e.g., cards) interconnected by a backplane of wires. Each card may include a plurality of ports that couple the switch to the other network entities over various types of media, such as Ethernet, FDDI or token ring connections. A network entity may consist of any device that "sources" (i.e., transmits) or "sinks" (i.e., receives) data frames over such media.

The switching function provided by the switch typically comprises receiving a frame at a source port from a network entity, processing the frame to determine a destination port, forwarding the frame over the backplane to at least one other destination port and, thereafter, transmitting that data over at least one medium to another entity of the network. When the destination of the frame is a single port, a unicast data transfer takes place over the backplane. In many cases, however, the destination of the frame may be more than one, but less than all of the ports of the switch; this results in a multicast data transfer being employed. Moreover, a typical switching mode implemented by the switch is a store-and-forward mode wherein the entire frame is received before initiating the forwarding operation. Many switches also generally support cut-through switching wherein forward processing begins as soon as a destination address of the frame is recognized.

To facilitate the forwarding of frames within the switch, the backplane is typically implemented as a switching fabric, such as a bus. The bus is generally a multipoint data path that is shared among the switch cards to transport information contained in the frames, such as address, data and control signals, needed by the cards to perform the data switching function. Because the bus is utilized in virtually every operation performed by the switch, it is a key component whose characteristics have a significant impact on the overall performance of the switch. For example, the speed at which the signals are transported over the bus impacts the effective data rate of the switch. This data rate is also effected by the manner in which the source port provides the data frames to the data path, along with the manner in which the destination port receives the frames from that path.

In a typical network switch, each port generally receives (and transmits) only one frame at a time, primarily because the logic associated with each port can only process one frame at a time. Although this arrangement is suitable for cut-through switching, it may lead to networking problems, a classic one of which is called head-of-line blocking. Head-of-line blocking may occur when many source ports attempt to send frames to a port that can only process frames serially. Head-of-line blocking, in turn, leads to congestion in the network, thus requiring extensive buffering of the frames at the source ports. One solution to this problem may be to expand the capability of the port to simultaneously receive (and transmit) a plurality of frames from different sources by replicating the logic of each port.

For example, each port typically includes (i) decode logic circuitry for decoding header information of the frame to determine an intended destination for that frame and (ii) state machine logic circuitry, coupled to the decode logic circuitry, for processing the frame. The logic circuits, which are generally implemented on an application specific integrated circuit (ASIC) "chip" device, cooperate to extract a destination address from the frame. Based on the destination address, a memory is accessed (via a look-up operation) to determine (via a forwarding decision operation) the intended destination.

Replicating the logic of the port n times on an ASIC chip results in n decode/state machine logic sets, each of which requires access to the memory. In order to realize the same memory bandwidth performance as the single port embodiment, n times the amount and width of memory is needed. Such an approach is expensive in terms of cost and chip footprint consumption. Accordingly, the present invention is directed to a low-cost switching device architecture that achieves performance similar to the totally replicated approach.

It is therefore an object of the present invention to provide a low-cost multi-port chip architecture that attains memory bandwidth performance equivalent to that of a single-port chip embodiment.

Another object of the present invention is to provide a multi-port switching device architecture that alleviates head-of-line blocking while improving memory bandwidth utilization.

SUMMARY OF THE INVENTION

The invention comprises a multi-port switching device architecture that decouples decode logic circuitry of each port of a network switch from its respective state machine logic circuitry and, significantly, organizes the state machine logic as pools of transmit/receive engine resources that are shared by each of the decode logic circuits. Since the pooled resources are not closely-coupled with respective ports, multiple engines may be employed to service a heavily-utilized port. Additionally, intermediate priority logic of the switching device cooperates with the decode logic and pooled resources to allocate frames among available resources in accordance with predetermined ordering and fairness policies. These policies prevent misordering of frames from a single source while ensuring that all ports in the device are serviced fairly.

In the illustrative embodiment, the architecture includes a transmit data path comprising a pool of transmit engines for driving inbound frames over a shared bus of the switch and a receive data path comprising a pool of receive engines for receiving out-bound frames from the bus. The pool of receive engines are available to capture multiple frames from the shared bus that are bound for network media via "downstream" ports of the device. Similarly, the pool of transmit engines are available to a single "upstream" port of the switching device when simultaneously sending multiple frames to the shared bus. Notably, these engines are configured to optimize bandwidth into a memory when executing look-up and/or forwarding decision operations.

By decoupling the decode logic from the state machines and pooling the state machines as transmit/receive engine resources, the invention advantageously allows sharing of the resources to satisfy multiple accesses to a single upstream port, particularly in a situation where the other ports are idle. This arrangement improves utilization of those resources, including memory bandwidth utilization, for situations where they would otherwise be idle. In addition, the inventive architecture improves performance of the switch by, inter alia, alleviating head-of-line blocking at a transmitting device.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
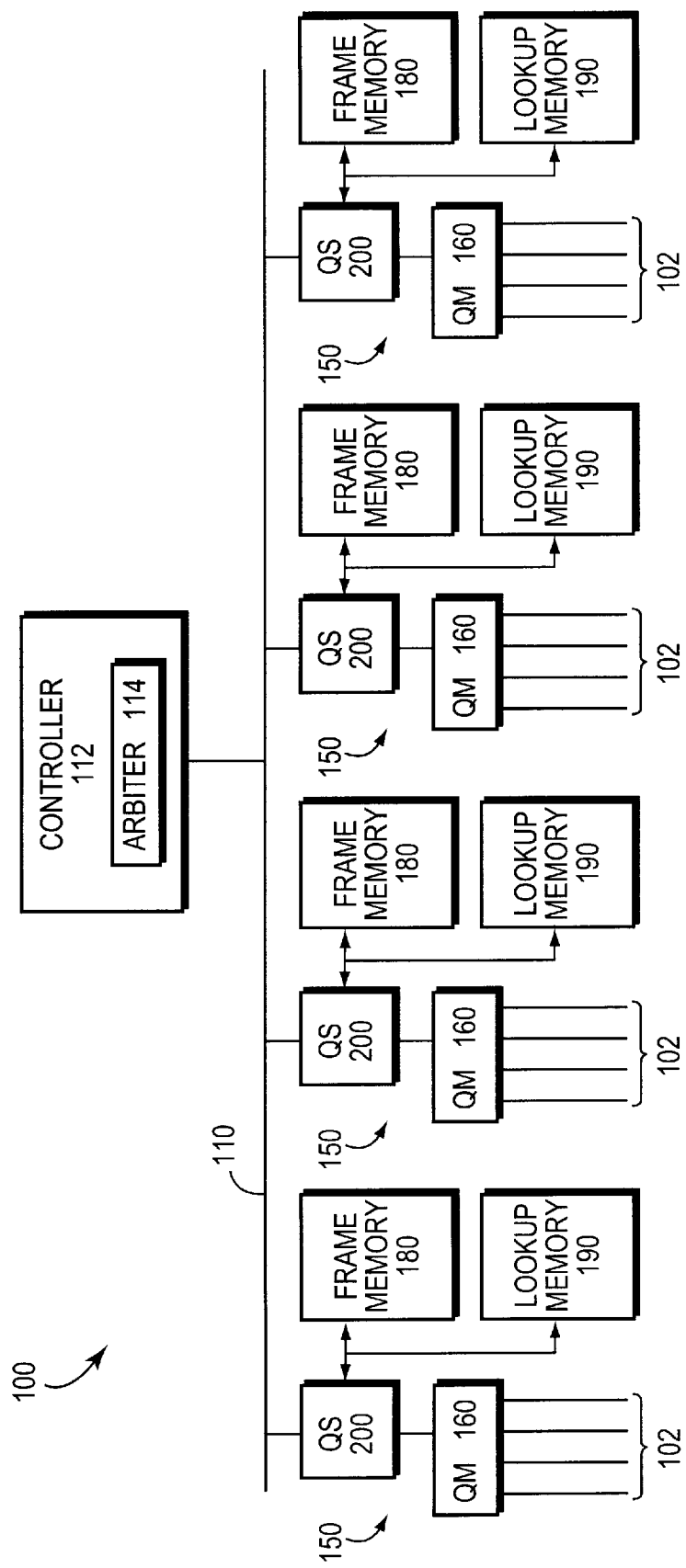
FIG. 1 is a schematic block diagram of a network switch comprising a switching fabric for interconnecting ports that may be advantageously used with the present invention.

FIG. 1 is a schematic block diagram of a network switch 100 comprising a switching fabric 110 for interconnecting ports 102 that couple the switch to network entities of a data communications network. A controller 112 is also coupled to the switching fabric and includes an arbiter 114 for arbitrating among port requests to access the shared fabric. Communication among the ports occurs synchronously over the switching fabric 110 using periodic bus cycles. The fabric is preferably a 32-bit, time division multiplexed (TDM) shared switching bus having a bus cycle of 60 nsecs; an example of a shared switching bus suitable for use with the present invention is the AXIS switching bus available from Cisco Systems Inc., San Jose, Calif.

Each port 102 of the switch is controlled by port interface circuitry 150 comprising a Quad Medium access control (QM) device 160 and a Quad Switch fabric interface (QS) device 200, the latter of which is coupled to a frame memory 180 and a lookup memory 190. In the illustrative embodiment, the switch may be a standalone intermediate station that functions as a multi-port bridge for interconnecting local area networks (LANs) such as Ethernet, FDDI or token ring networks. The standalone embodiment preferably comprises four (4) QS devices 200 coupled to the shared bus 110 with each QS servicing four (4) ports via a QM device 160. However, in an alternate embodiment, the switch 100 may be coupled to a higher-level switch, such as the Catalyst 5000 switch from Cisco Systems Inc. For such an application, the switch 100 functions a LAN switch engine that is implemented on a line card.

The QM 160 comprises medium access control (MAC) circuitry that provides an IEEE 802.3, IEEE 802.5 or FDDI MAC service layer for moving the frames to and from the LAN; more specifically, the MAC capability allows attachment of the switch to a network entity, such as a processor or similar circuit that interfaces with LAN medium connections. Although the switch 100 is preferably configured with ports that interface to the LANs described herein, it will be apparent to those skilled in the art that the QM 160 could be configured with alternate service layers, such as IEEE 802.1 Q, Interswitch Link (ISL, available from Cisco Systems, Inc.) and asynchronous transfer mode (ATM) service layers, for moving frames among different networks and links, such as IEEE 802.1 Q and ISL connections or ATM networks.

Figure 2:
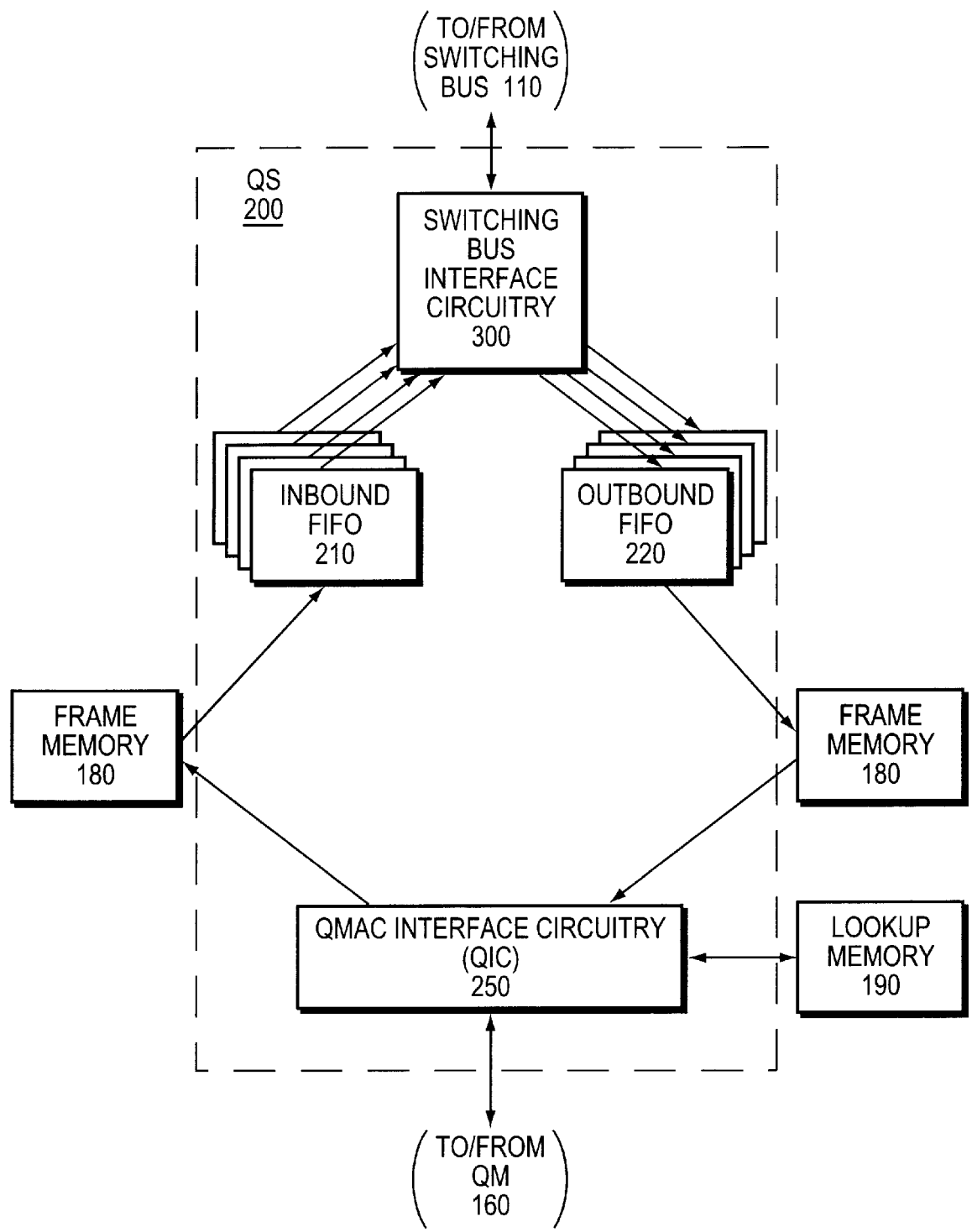
FIG. 2 is a schematic block diagram of a multi-port switching device in accordance with the present invention.

FIG. 2 is a schematic block diagram of a QS 200 which is preferably a multi-port switching device implemented on an application specific integrated circuit (ASIC) chip. Each QS of the switch performs data buffering and frame manipulation, as well as filtering, look-up and forwarding decision operations. The QSs thus collectively provide the "intelligence" for transferring frames throughout the switch 100 in a distributed switching processing arrangement. To that end, each QS 200 comprises inbound/outbound frame buffers 210, 220 coupled between Quad MAC Interface Circuitry (QIC) 250 and novel multi-port switching bus interface circuitry 300.

Broadly stated, the QIC 250 comprises conventional logic circuitry for parsing predetermined fields from inbound frames received from the networks and, using the contents of those parsed fields, performing look-up operations at the lookup memory 190 in order to render forwarding decisions for the frame data. In addition, the QIC 250 appends predetermined fields to data received from the switching bus and destined for the networks. The interface circuitry 300 participates in switching bus arbitration and, using the results of the look-up operations, renders forwarding decisions that transfer the frame data between the switching bus 110 and memory 180 via frame buffers 210, 220, each of which is preferably a first-in, first out (FIFO) memory. The interface circuitry 300 also performs protocol-based filtering operations on outbound data.

Operationally, a frame is received at a "downstream" port of a QM 160 and passed to a source QS 200 where the QIC 250 parses a destination address from the in-bound frame and performs a look-up operation to the memory 190 using, inter alia, the destination address. Based on the lookup operation, a port-of-exit (POE) mask is assigned to the frame. The POE is preferably a 32-bit map that is translated to a corresponding "upstream" destination port (or group of ports) selected to receive the frame. The switching bus interface logic 300 of the source QS decodes the POE to render a forwarding decision and arbitrates for access to the shared bus 110. Upon receiving a bus grant from the arbiter 114, the logic 300 drives the POE over the bus where it is received by the interface logic 300 of the destination QS 200. The destination QS returns an acknowledgment signifying that it is ready to receive the frame and, in response to the acknowledgement, the interface logic of the source QS drives the frame over the bus 110.

Figure 3:
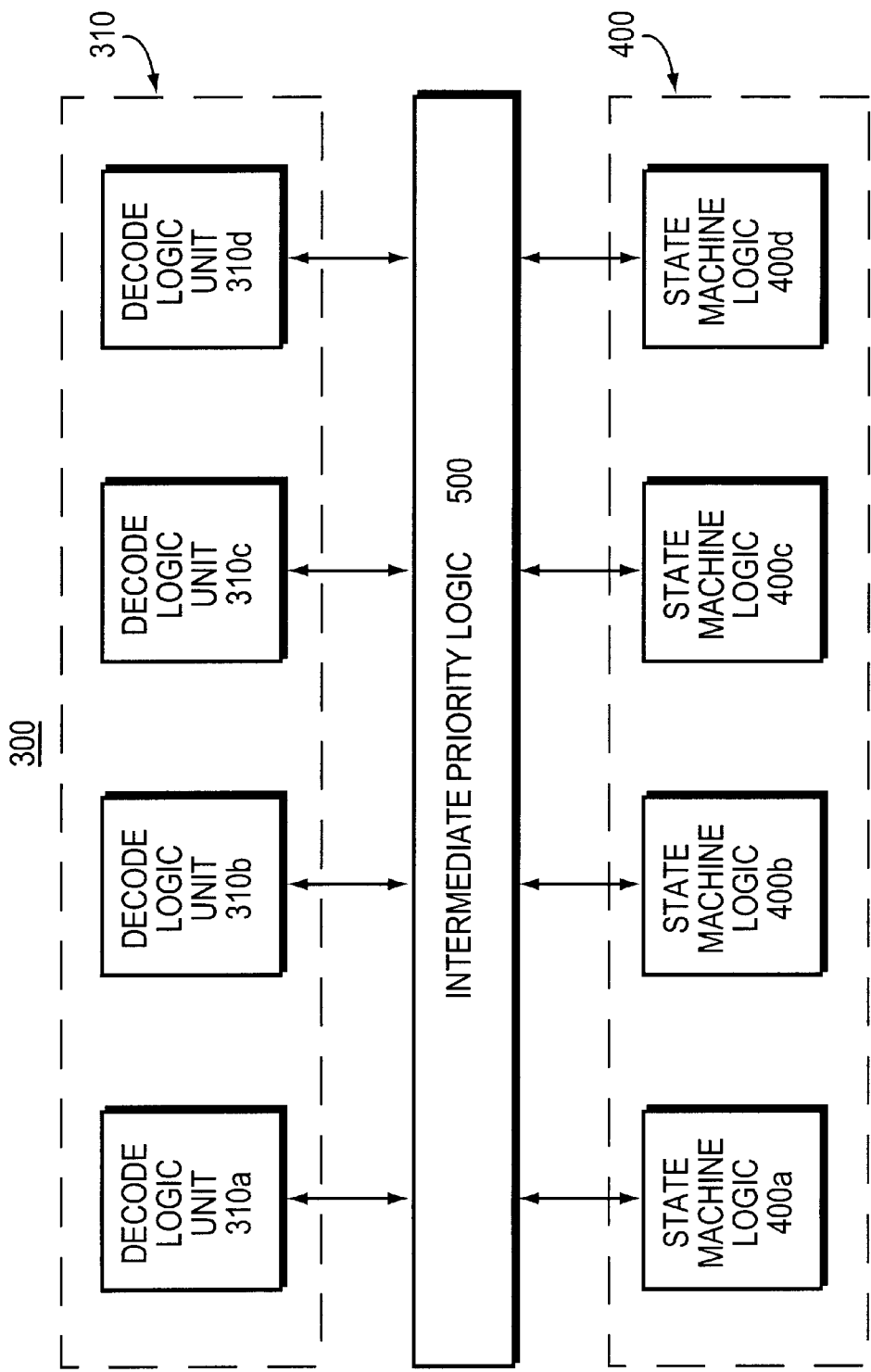
FIG. 3 is a schematic block diagram of switching bus interface circuitry comprising decode logic circuits and pooled state machine resources interconnected by intermediate priority logic in accordance with the invention.

FIG. 3 is a schematic block diagram of the switching bus interface circuitry 300 comprising decode logic circuits 310a–d, generally designated 310, and logic circuits 400a–d, generally designated 400, interconnected by intermediate priority logic 500. In the illustrative embodiment, the logic circuits 400 are preferably implemented as a conventional hardware registers and combinational logic configured to produce sequential logic circuits, such as state machines, for processing frames transferred throughout the switch. The decode logic circuits 300 preferably comprise conventional logic circuitry for decoding header information, including POE information, associated with the frames that is used to determine destination ports within the switch for those frames.

According to the invention, the interface circuitry 300 comprises a multi-port switching device architecture that decouples the decode logic circuitry 310 from its respective state machine logic circuitry 400. The decoupled state machine logic circuits are organized as pools of transmit/receive engine resources shared by each of the decode logic circuits 310. Furthermore, each of the pooled state machine resources is connected to the frame memory 180 and tailored to its bandwidth. By decoupling the pooled resources 400 from respective decode logic ports, multiple engines may be employed to service a heavily-utilized port.

Figure 4:
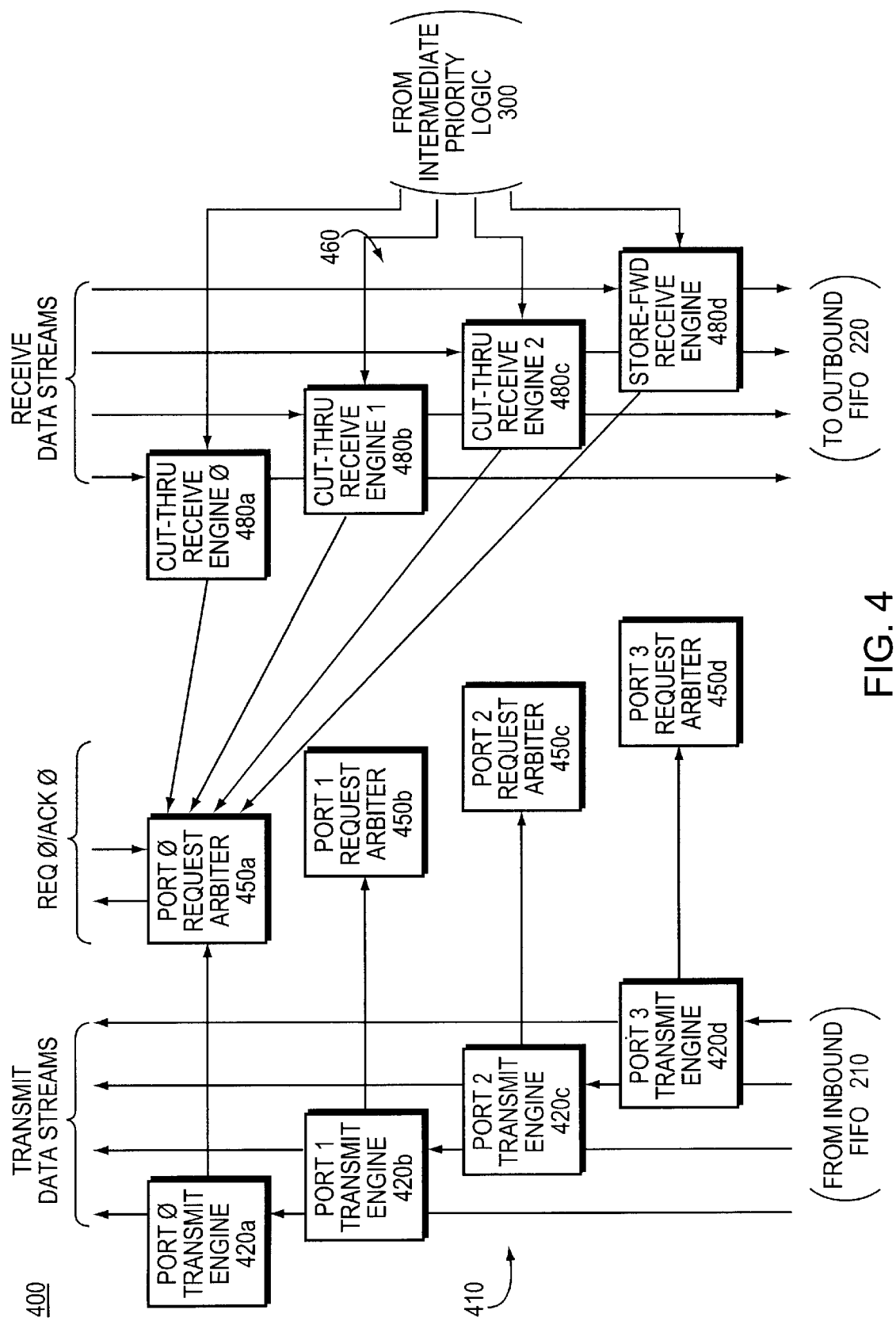
FIG. 4 is a schematic block diagram illustrating the architecture of the pooled state machine resources.

FIG. 4 is a schematic block diagram illustrating the architecture of the pooled state machine resources 400. The architecture includes a transmit data path 410 comprising a pool of transmit engines 420 for driving inbound frames over the shared bus 110 and a receive data path 460 comprising a pool of receive engines 480 for receiving outbound frames from the bus. The pool of receive engines 480 are available to any source and are available to capture multiple frames from the shared bus 110 that are bound for network media via downstream QM ports 102 of the device. Furthermore, the pooled receive engines are not allocated to specific QM ports and are, in fact, available to any downstream port 102. Similarly, the pooled transmit engines 420 are available to a single upstream QS port of the switching device 200 when simultaneously sending multiple frames to the bus. As noted, these engines are configured to optimize bandwidth into memory 180.

The transmit data path 410 comprises four identical transmit engines 420 that control the movement of data from the inbound FIFOs 210 to the shared bus 110 for each of the four QM ports 102. The pooled transmit engines are depicted in FIG. 4 as Ports 0–3 Transmit Engines 420a–d. Note that there is an inbound FIFO 210 (FIG. 2) associated with each transmit engine. Before initiating a frame transfer to the shared switching bus, each transmit engine 420 decodes a header of the frame and its POE to determine, inter alia, the number of bytes in the last frame and the transfer rate for the frame. Each transmit engine further independently participates in both unicast and multicast arbitration, and initiates cut-through or store-and-forward transfers as appropriate.

Due to frame memory bandwidth constraints, the QS illustratively supports only a single store-and-forward data stream from the shared bus 110 at a time. To compensate for this, the pooled resources 400 allows three (3) cut-through frames and a single store-and-forward frame to be simultaneously received from the bus. The receive data path 460 comprises four receive engines that include logic for processing the received frames and transferring the frames from the bus to the outbound FIFO 220. Three of the engines support only cut-through frames, while the fourth is dedicated to store-and-forward frame transfers. Accordingly, the pooled receive engines include Cut-thru Receive Engines 0–2 480a–c and a Store-fwd Receive Engine 480d. The engine 480d is used to transfer a frame in store-and-forward mode over the shared bus to a port when the frame is entirely stored in the frame memory 180. If the frame is not completely buffered and is destined for another QS port, a cut-through receive engine 480a–c (and protocol) is utilized unless the store-and-forward mode is explicitly requested. Each receive engine is allowed to capture frames destined for any of the four QM ports and, as noted above with the transmit data path, there is an outbound FIFO 220 associated with each receive engine.

The pooled resources 400 further include port arbitration request logic implemented as Port 0–3 Request Arbiter circuits 450a–d. These circuits 450 are used to control arbitration requests for both the transmit engines 420 when driving data over the shared bus 110 and for the receive engines 480 when responding with acknowledgments to receive data from the bus. Note that only control signals for the Port 0 Request Arbiter are shown.

When a first frame is received by a decode unit, such as decode unit 310a, the frame is forwarded by intermediate logic 500 to an available receive engine 480 for processing. Note that each receive engine may process one frame at a time and store that processed frame in the common frame memory 180 (via the outbound FIFO). If the memory 180 is not fully utilized such that other receive engines are idle, the intermediate logic 500 may assign a second frame received at decode unit 310a to another receive engine for processing. According to the invention, a single decode unit can actively receive frames from four different sources at once, whereas any receive engine can accept a frame from any source, i.e., the engine is not allocated to a specific source. Although this arrangement may introduce issues with respect to data ordering of frames from a single source and fair utilization of the pooled resources, the invention advantageously allows the memory 180 to be fully utilized in terms of its bandwidth by keeping the memory-access "pipeline" full for as long as possible.

Specifically, the inventive arrangement allows the memory bandwidth to be tailored to the bandwidth requirements of the three (3) cut-through engines and the store-fwd engine. For example, the cut-through data stream bandwidth is generally equal to the data rate (speed) of the external media connection, whereas the store-fwd data stream bandwidth is generally less than the speed of the shared bus. In any event, the total bandwidth of the data streams should not exceed the total available bandwidth of the frame memory 180. The arrangement described herein further alleviates head-of-line blocking in a simple and cost-effective manner by obviating extensive frame buffering when other receive engines are idle.

Issues pertaining to the pooled state machine logic 400 involve (i) fairness among the decode logic units (and upstream QS ports) with respect to utilization of the pooled resources and (ii) ordering of data streams through the pooled resources. Data ordering is typically not an issue in the single-port prior art approach where all frames from a source that are destined to a particular upstream port are received by decode logic that is directly coupled to its state machine logic. In this case, the order of frame processing is generally not altered because each frame is processed serially through that port's logic. However, for the present pooled queue invention, a decode logic unit of a port may allocate multiple frames from a single source among the pooled state machine devices with the possibility of the frames being processed out-of-order.

Therefore, according to an aspect of the invention, the intermediate priority logic 500 cooperates with the decode logic and pooled resources to allocate frames among available resources in accordance with predetermined ordering and fairness policies. These policies prevent misordering of frames from a single source while ensuring that all ports in the device are serviced fairly. To that end, the intermediate logic 500 generally comprises conventional sequencing logic that prevents out-of-order frame processing, while also preventing a decode logic block from monopolizing the pooled resources.

Figure 5:
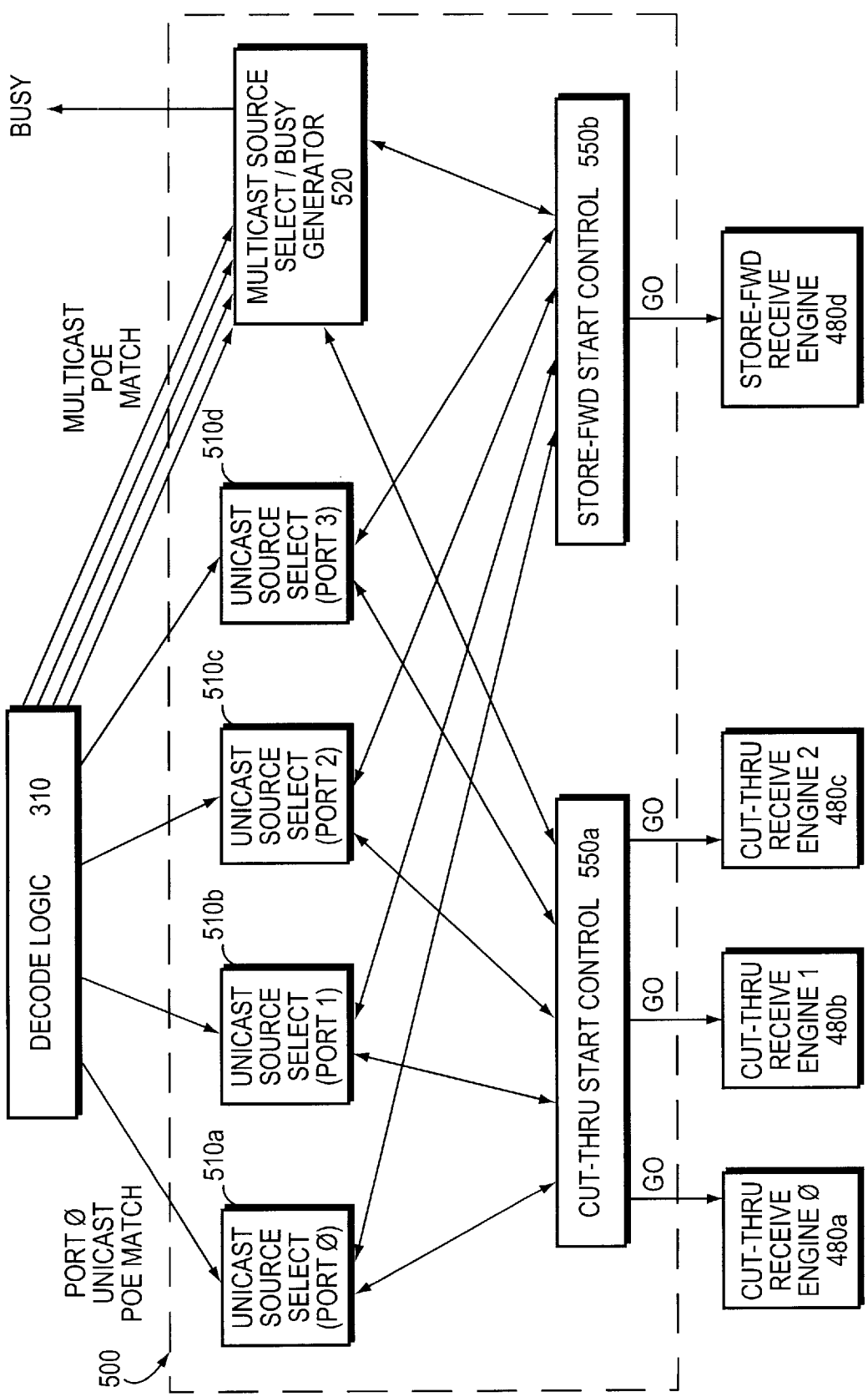
FIG. 5 is functional block diagram depicting the intermediate priority logic according to the invention.

FIG. 5 is a functional block diagram depicting the intermediate priority logic 500. The intermediate logic (i.e., scheduler) 500 is preferably organized according to the arbitration scheme of the shared switching bus 110 and, as such, is configured as source select circuits (ports 0–3) 510*a–d* for unicast frame transfers, as well as a separate logic circuit generator 520 for multicast transfers where those frames are tagged and sent through the logic. Functionally, the scheduler 500 monitors the decode logic 310 for matching POEs and instructs an appropriate receive engine 480 to process an incoming frame. The scheduler ensures that all four MAC ports are serviced fairly for both cut-through and store-and-forward frame transfers. Since only one incoming store-and-forward stream is allowed by the QS at a time, the scheduler services the requests in a round-robin fashion. To prevent both uneven switch loading and a single source from locking a destination QS port to other traffic for an extended period of time, multiple sources sending to the same QS port are also serviced in a round-robin fashion. The scheduler 500 further insures that multiple receive engines do not capture the same frame, including multicast frames, from the shared bus.

Specifically, the ordering algorithm implemented by the scheduler involves utilization of the resource side of the QS and is essentially source-based; fundamentally, if a frame from a source is being processed by a state machine engine then another frame from that source will not be accepted at another state machine until the first frame is completely processed. This ensures that frames from a particular source to a particular destination are not processed out-of-order. Specifically, the decode logic 310, as part of its decode function, "learns" the source of the frame and provides that information to the scheduler 500 for assignment of resources to incoming frames. Before assigning a frame to a state machine, the scheduler checks each active receive engine 480 to determine if any resource is processing a frame from a particular source. If so, the scheduler 500 stalls the subsequent frame from that source and examines the status of another frame.

The fairness algorithm is basically a round-robin prioritization that involves the decode logic side of the QS; thus it is port-based in terms of not allowing a particular QS port to monopolize the resources. After a decode logic port receives a frame that issues to a receive engine 480 via the scheduler, the decode logic's priority drops from a highest priority to a lowest priority. For example, when a port's priority is "1" (highest), it is allowed to issue a frame to the intermediate logic for processing by a resource engine. After frame processing is assigned (or intentionally stalled) the port's priority drops to "4" (lowest) and the remaining decode logic units increase their priorites in round-robin rotation. Once a port having highest priority issues a frame for resource assignment (or doesn't have anything to assign during its turn), then that port drops to the lowest priority. Again, the intermediate logic 500 controls such fairness arbitration.

The ordering and fairness algorithms are controlled by priority cut-thru start control logic 550*a* and store-fwd start control logic 550*b*. The logic, generally designated 550, issues a Go request to one of the pooled receive engines to begin processing a frame in response to source-issuance information provided by the decode logic units and source-processing information provided by the receive state machines. Upon issuing the Go request, the priority logic 550 resolves priority according to the fairness and ordering algorithms by reassigning priority among the decode logic units. In addition, the priority logic enables all decode logic units to issue frames (and have them assigned to receive engine resources) at that same time.

In summary, the invention decouples the decode logic from the state machine logic to thereby create a pool of state machine resources that are tailored to the memory bandwidth and that are accessible by each of the decoupled decode logic units. Pooling of the resources improves the utilization of the state machines; accordingly, a goal of the invention is to keep the state machine logic full (busy) at all times by processing and passing data through the memory. The inventive arrangement allows the state machine engines to operate in parallel to access the memory for purposes of processing the frames. Moreover, the intermediate priority logic allows sharing of the resources according to fairness and ordering algorithms to thereby enable the inventive multi-port switching device architecture to achieve the same performance as a replicated multi-port approach while enhancing full utilization of the state machines and, thus, the memory bandwidth.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A multi-port switching device adapted to transfer and receive frames to and from a bus of a network switch having a plurality of ports, the switching device comprising:

a plurality of decode logic units for decoding header information associated with the frames;

state machine circuitry configured as a plurality of resources for processing the frames; and intermediate priority logic connecting the decode logic units and the state machine resources, the intermediate priority logic cooperating with the decode logic units and state machine resources to fairly and orderly allocate the frames among the state machine resources.

2. The switching device of claim 1 wherein the state machine resources are organized as (i) a transmit data path comprising a pool of transmit engines for driving inbound frames over the bus and (ii) a receive data path comprising a pool of receive engines for receiving outbound frames from the bus.

3. The switching device of claim 2 wherein each receive engine may process one outbound frame at a time and store that processed frame in a memory.

4. The switching device of claim 3 wherein the memory is one of an outbound first-in, first-out memory and a common frame memory.

5. The switching device of claim 4 wherein one of the pooled receive engines is configured to receive store-and-forward frames and the remaining pooled receive engines are configured to receive cut-through frames.

6. The switching device of claim 5 wherein bandwidth requirements of the pooled receive engines are tailored to a total available bandwidth of the common frame memory.

7. The switching device of claim 2 wherein the ports comprise destination ports, and wherein pooled receive engines are available to any destination port.

8. The switching device of claim 2 wherein the ports comprise source ports, and wherein the pooled receive engines are available to any source port.

9. The switching device of claim 2 wherein the pooled transmit engines are available to any source port when simultaneously sending the inbound frames to the bus.

10. The switching device of claim 1 wherein the intermediate priority logic executes predetermined ordering and fairness policies to allocate the frames among available resources.

11. The switching device of claim 10 wherein the ordering policy involves utilization of the resources and is source-based in that if a first frame forwarded from a source is processed by a state machine resource, then another frame from that source is not accepted at another state machine resource until the first frame is completely processed.

12. The switching device of claim 10 wherein the fairness policy comprises a round-robin prioritization involving the decode logic units that is port-based in that the policy does not allow a particular port to monopolize the resources.

13. A method for transferring and receiving frames to and from a bus of a network switch having a plurality of ports, the method comprising the steps of:

decoding header information associated with the frames using a plurality of decode logic units;

processing the frames with state machine circuitry configured as a plurality of resources; and connecting the decode logic units and the state machine resources with intermediate priority logic, the intermediate priority logic cooperating with the decode logic units and state machine resources to fairly and orderly allocate the frames among the state machine resources.

14. The method of claim 13 further comprising the step of organizing the state machine resources as (i) a transmit data path comprising a pool of transmit engines for driving in-bound frames over the bus and (ii) a receive data path comprising a pool of receive engines for receiving outbound frames from the bus.

15. The method of claim 14 wherein the step of processing further comprises the steps of:

processing one outbound frame at a time at each receive engine; and storing the processed frame in a memory.

16. The method of claim 15 wherein the step of organizing further comprises the steps of configuring (i) one of the pooled receive engines to receive store-and-forward frames and (ii) the remaining pooled receive engines to receive cut-through frames.

17. The method of claim 16 further comprising the step of, wherein the memory is a frame memory, tailoring bandwidth requirements of the pooled receive engines to a total available bandwidth of the frame memory.

18. The method of claim 13 further comprising the step of allocating the frames among available resources in accordance with predetermined ordering and fairness policies of the intermediate priority logic.

19. The method of claim 18 further comprising the steps of, wherein the ordering policy involves utilization of the resources and is source-based, processing a first frame forwarded from a source port by a state machine resource; and accepting another frame from that source at another state machine resource only when the first frame is completely processed.

20. The method of claim 18 further comprising the step of, wherein the fairness policy comprises a round-robin prioritization involving the decode logic units that is port-based, preventing a particular port from monopolizing the resources.

* * * * *